United States Patent [19] [11] 3,885,030
Tixier [45] May 20, 1975

[54] MEDICINE COMPRISING LYSINE BY-PRODUCTS

[76] Inventor: Georges Tixier, 37 Ave. d'Iena, Paris, 16, France

[22] Filed: May 9, 1973

[21] Appl. No.: 358,694

[30] Foreign Application Priority Data
May 19, 1972 France.............................. 7218165

[52] U.S. Cl. .............................................. 424/180
[51] Int. Cl.² .......................................... A01N 9/00
[58] Field of Search .................................... 424/180

Primary Examiner—Elbert L. Roberts
Attorney, Agent, or Firm—Browdy & Neimark

[57] ABSTRACT

Medicinal preparations containing lysine by-products, as well as nucleoproteins under two forms, especially in the form of lysine desoxyribonucleinate and ribonucleinate and puric and pyrimidic bases.

8 Claims, No Drawings

MEDICINE COMPRISING LYSINE BY-PRODUCTS

The object of applicant's co-pending Pat. application Ser. No. 296,583 filed Oct. 11, 1972 is a medicine containing lysine by-products, and especially of the pantothenate of this essential amino-acid, which are used to cause stimulation of different metabolic mechanisms, particularly those concerning the formation of leucocytes.

It has yet been possible, by adding various medicinal substances to the lysine by-products, to reinforce the physiological and clinical effects of the formulas previously described in said co-pending Patent Application and to extend the field of therapeutical applications therein before explained.

According to the present invention, the lysine by-products are associated with nucleoproteins, more commonly referred to as nucleotids, or various products of degradation of these compounds. It will be possible to use, according to the invention, defined nucleotids and also genuine nucleotids and puric and pyrimidic bases of the bone medulla and of the spleen.

According to another characteristic of the invention, the different medicinal principals which are utilized can be included in various medicinal formulas in a digestive or injectable form, thus providing an optimum application in human therapeutics.

The physiological and therapeutic properties of the products, prepared according to this present addition, are established by a group of experimental and clinical results.

I - TOXICO-PHARMACOLOGY

A. The new products utilized according to the invention have no acute or lingering toxicity. Expecially:
. The $LD_{50}$ of the lysine desoxyribonucleinate or lysin ribonucleinate is lower than 6 g/Kg;
. The $LD_{50}$ of the splenic extract is lower than 8 g/Kg;
. The $LD_{50}$ of the bone medulla extract is lower than 7 g/Kg.

The extracts designed to be injected are completely deprived of histamin; the extracts designed for the digestive way must only contain low proportions of said substance.

The extended administration to rats of the various formulas included in the present invention has not caused the noticeable appearance of any phenomenon of inability to tolerate said formula, and the anatomo-pathological tests have revealed no modification of the principal tissues and organs of the animals.

B. The formulas, according to the present invention, have a regeneration effect on the leucocytes of the animals having been rendered leucopenic:
a. either by the administration of poisons of the Endoxan type (cyclo-phosphamid),
b. or by irradiation by X-rays.

Besides, the administration of the medicines typically described in the present invention causes a certain immunity relating to the poisonous effects of the radiations in irradiated animals, resulting in a significant increase of the surviving animals.

In the following Table are shown the results obtained by using the formula I, which is given hereinafter:

|  | Leucocytes per mm3 3rd day (1) | Leucocytes per mm3 10th day | Leucocytes per mm3 16th day | Number of survivors out of 20 (2) | Percentage of mortality (2) |
|---|---|---|---|---|---|
| Batch No 1 Reference | − 9.65% | − 9.24 % | + 7.14 % | 11 | 45 % |
| Batch No 2 Treated by Formula I | − 7.51% | +13.21 % | + 31.50 % | 19 | 5 % |

(1) The results are given in percentage with respect to the number of leucocytes as determined before irradiation and treatment.
(2) The mortality is established one month after irradiation of the animals.

II. CLINICAL RESULTS

The formulas, according to the invention, have been administered to patients having, either very various aetiology leucopenia e.g. diseases, medicinal or professional poisoning, or to patients submitted, for a therapeutical purpose, to various radiations or to antimitotics.

In a general way there has been obtained in a very large number of cases, on the whole treated patients:
a. a normalization of the leucocyte formula, as well considering the numeration as the repartition between the different categories of the white blood elements.
b. a recovery of the health state, an improvement of some functional troubles, an increase in weight and appetite, a comfort and well-being feeling; this well-being condition being particularly felt by the patients treated by the radiations or the antimitotics and have beneficient effects on the state of mind.
c. an increase, in some cases, of the number of hematoblasts.

Some of the clinical cases are give below: Case No 1 - Mrs C....33 years old.

Benzolic poisoning with polyadenopathies, allergic reactions with medullar aplasy. Treated by the drinkable formula I, 4 vials per day during 8 days.

|  | GB | N | E | L | M |  |
|---|---|---|---|---|---|---|
| before treatment | 1900 | 1 | 1.5 | 68.5 | 59 | aplasic medulla |

|  | GB | N | E | L | M |  |
|---|---|---|---|---|---|---|
| after treatment | 4300 | 55.5 | 0 | 34.5 | 10 | medulla in accelerated regeneration |

The condition of the emaciated, anorexic patient is notably improved by the treatment which causes a recovery of appetite, weight increase of 1 kg, and a recovery of the medullar activity. Case No 2 - Mrs G.....Ambien cyst Treated by the drinkable formula I, 2 vials a day during 14 days.

|  | GB | N | E | L | M |
|---|---|---|---|---|---|
| before treatment | 3300 | 70 | 1 | 19 | 10 |
| after treatment | 5300 | 62 | 2 | 31 | 5 |

Noticeable improvement of the general condition with weight increase. Case No 3 - Mr. M....Lung cancer treated with cobalt. Treated by the drinkable formula I, 3 vials a day during one month.

|  | GB | N | E | L | M |
|---|---|---|---|---|---|
| before treatment | 2400 | 41 | 13 | 40 | 6 |
| After treatment | 5300 | 68 | 2 | 26 | 4 |

The patient shows, during the treatment, a very noticeable well-noticeable well-being feeling, he does not show any weight decrease during the irradiation process. Case No 4 - Mrs B.....Kalher disease Treated by the drinkable formula I, 1 vial per day during 15 days.

|  | GB | N | E | L | M |
|---|---|---|---|---|---|
| before treatment | 2600 |  |  |  |  |
| after treatment | 6900 |  |  |  |  |

Comfort and well-being feeling, improvement of appetite, stoppage of the weight decrease.

As non-limitative examples, below are given formulas according to which the medicines of the invention, can be presented:

Drinkable vials (Formula I)

| | |
|---|---|
| Lysine pantothenate | 0.60 g |
| Lysine desoxyribonucleinate | 0.30 g |
| Bone medulla extact at 100/I | 0.15 g |
| Splenic extract at 100/I | 0.15 g |
| Aromatized excipient and preservative S.q.p. | 10 ml |

Vials of 10 ml
(2 to 4 vials a day)

| | |
|---|---|
| Lysine pantothenate | 0.60 g |
| Lysine ribonucleinate | 0.30 g |
| Bone medulla extract at 100/I | 0.15 g |
| Splenic extract at 100/I | 0.15 g |
| Aromatized excipient and preservative S.q.p. | 10 ml |

Drinkable vials (Formula I)

Injectable vials

| | |
|---|---|
| Lysine pantothenate | 0.30 g |
| Lysine desoxyribonucleinate | 0.15 g |
| Bone medulla extract at 100/I | 0.10 g |
| Splenic extract at 100/I | 0.10 g |
| Water P.P.I. S.q.p. | |

Isotonic sterile vials of 5 ml

One intra-muscular injection every day or every two days.

| | |
|---|---|
| Lysine pantothenate | 0.30 g |
| Lysine ribonucleinate | 0.15 g |
| Bone medulla extract at 100/I | 0.10 g |
| Splenic extract at 100/I | 0.10 g |
| Water P.P.I. S.q.p. | 5 ml |

Some variant of posology, proportions or presentation can be brought to the above formulas.

I claim:

1. A pharmaceutical composition in dosage form for reestablishing normal leukocyte formula figures in leukopenic patients comprising:
   an amount sufficient to reestablish normal leukocyte figures in leukopenic patients of a mixture of on the order of about 60 parts by weight of lysine pantothenate with on the order of about 30 parts by weight of a nucleotid selected from the group consisting of lysine desoxyribonuclinate and lysine ribonucleinate, and on the order of about 30 to 40 parts by weight of the puric and pyrimidic bases of the bone medulla and of the spleen; and
   a pharmaceutically acceptable carrier therefor.

2. Medicine as set forth in claim 1, wherein said medicine comprises:

| | |
|---|---|
| Lysine pantothenate | 0.60 g |
| Lysine desoxyribonucleinate | 0.30 g |
| Bone medulla extract at 100/I | 0.15 g |
| Splenic extract at 100/I | 0.15 g |
| Aromatized excipient and preservative S.q.p. | 10 ml | in the form of drinkable vials.

3. Medicine as set forth in claim 1, wherein said medicine comprises:

| | |
|---|---|
| Lysine pantothenate | 0.60 g |
| Lysine ribonucleinate | 0.30 g |
| Bone medulla extract at 100/I | 0.15 g |
| Splenic extract at 100/I | 0.15 g |
| Aromatized excipient and preservative S.q.p. | 10 ml | in the form of drinkable vials.

4. Medicine as set forth in claim 1, wherein said medicine comprises.

| | |
|---|---|
| Lysine pantothenate | 0.30 g |
| Lysine desoxyribonucleinate | 0.15 g |
| Bone medulla extract at 100/I | 0.10 g |
| Splenic extract at 100/I | 0.10 g |
| Water P.P.I. S.q.p. | 5 ml | as injectable vials for intra-muscular method.

5. Medicine as set forth in claim 1, wherein said medicine comprises:

| | |
|---|---|
| Lysine pantothenate | 0.30 g |
| Lysine ribonocleinate | 0.15 g |
| Bone medulla extract at 100/I | 0.10 g |
| Splenic extract at 100/I | 0.10 g |
| Water P.P.I. S.q.p. | 5 ml |
| as injectable vials for intra-muscular method. | |

6. A pharmaceutical composition in accordance with claim 1 consisting essentially of lysine pantothenate; a lysine nucleotid selected from the group consisting of lysine desoxyribonucleinate and lysine ribonucleinate; bone medulla extract and spleenic extract.

7. A method for treating leukopenia comprising administering to a patient having leukopenia the composition of claim 1 in a dosage effective to increase the leukocyte numeration of the patient.

8. A method of increasing the leukocyte numeration of a patient in need of said therapy, comprising administering in unit dosage form, to a patient in need of said therapy, a composition of claim 6 in an amount effective to increase the leukocyte numeration of said patient.

* * * * *